United States Patent [19]

Herbenar

[11] E Re. 31,298

[45] Reissued Jul. 5, 1983

[54] SPRING SHACKLE ASSEMBLY

[75] Inventor: Edward J. Herbenar, Birmingham, Mich.

[73] Assignee: TRW Inc., Cleveland, Ohio

[21] Appl. No.: 62,536

[22] Filed: Jul. 31, 1979

Related U.S. Patent Documents

Reissue of:

[64] Patent No.: 4,083,545
Issued: Apr. 11, 1978
Appl. No.: 719,190
Filed: Aug. 31, 1976

[51] Int. Cl.[3] ..... B60G 11/12

[52] U.S. Cl. ..... 267/54 A; 280/716; 280/718; 403/158

[58] Field of Search ..... 267/54 A, 54 B, 54 R, 267/54 E; 280/716, 718, 694, 699, 719, 720, 669, 664, 680, 686; 308/238, 241, 72; 403/157-158

[56] References Cited

U.S. PATENT DOCUMENTS

| | | | |
|---|---|---|---|
| 1,767,717 | 6/1930 | Stover | 267/54 E |
| 1,807,099 | 5/1931 | Cooper | 267/54 R |
| 2,305,795 | 12/1942 | Schiegerstein | 280/716 |
| 2,435,935 | 2/1948 | Voorhies | 308/72 |
| 3,218,054 | 11/1965 | Nallinger | 267/54 E |
| 3,400,945 | 9/1968 | Sampietro | 280/664 |
| 3,574,368 | 4/1971 | Songer | 308/72 |
| 3,578,366 | 5/1971 | Snidar | 308/72 |
| 3,602,560 | 8/1971 | Memmel | 308/238 |

FOREIGN PATENT DOCUMENTS

| | | | |
|---|---|---|---|
| 81102 | 10/1951 | Czechoslovakia | 280/699 |
| 192487 | 2/1923 | United Kingdom | 267/54 R |

*Primary Examiner*—Douglas C. Butler
*Attorney, Agent, or Firm*—Yount & Tarolli

[57] ABSTRACT

An improved spring shackle assembly is utilized in an improved vehicle suspension system and includes a pair of socket assemblies which connect an end portion of a leaf spring with a mounting bracket. Each of the socket assemblies includes a rigid metal housing having an inner surface which defines a socket chamber in which a bearing liner is disposed. Each of the bearing liners encloses a spherical end portion of a ball stud. Each ball stud has a generally cylindrical shank which extends into an opening formed in an end portion of the spring. In order to tend to minimize the sideward load applied to the mounting bracket, the bearing liners have spherical surfaces which cooperate with the spherical head ends of the ball studs so that offsetting axial or sidewise forces are applied to the bearing liners by the ball studs. The socket assembly has a unitary construction to facilitate assembly and to minimize the chance for dirt and other foreign materials to enter the socket chamber. In one embodiment of the invention, the bearing lines are integrally formed of a suitable polymeric material. In another embodiment of the invention the bearing liners are formed in two sections. One of the two bearing sections carries a larger bearing load and is formed of a material having a higher modulus of elasticity than the other bearing section.

15 Claims, 5 Drawing Figures

Fig. 1
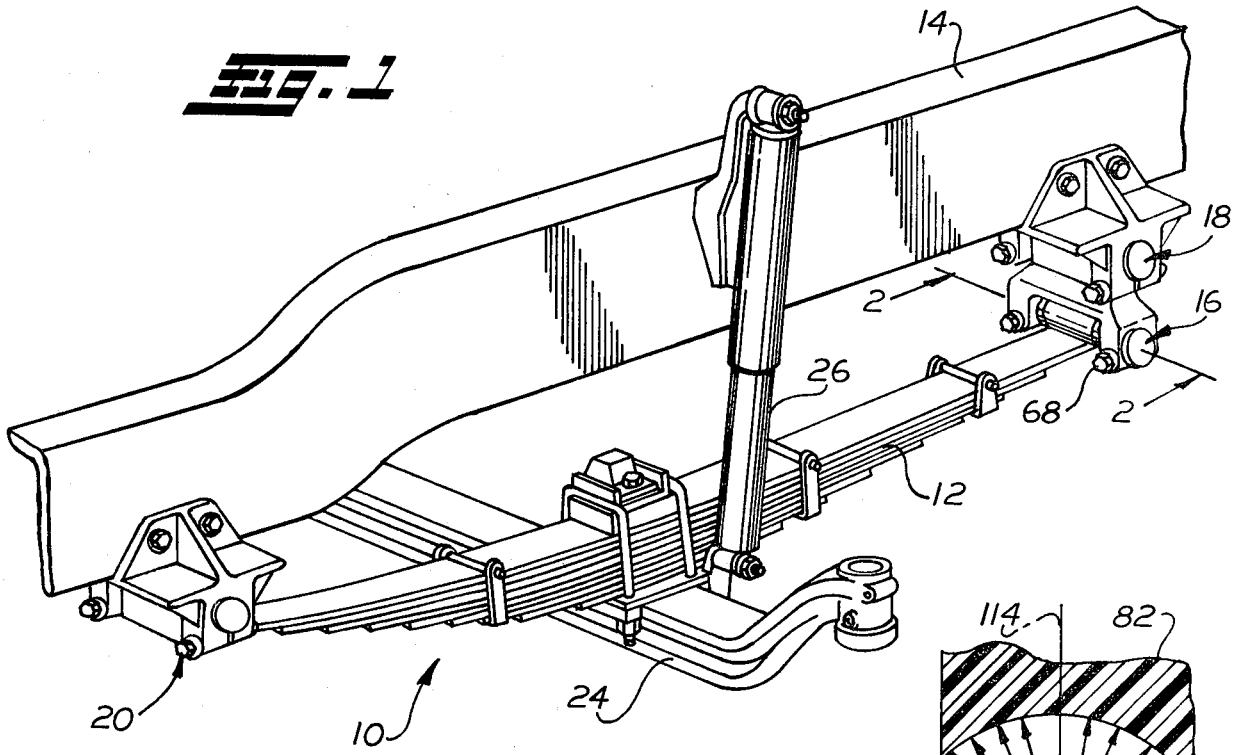
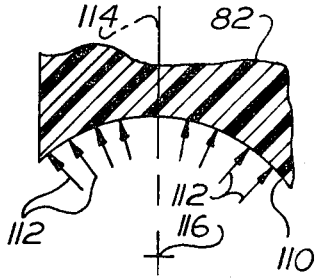
Fig. 3
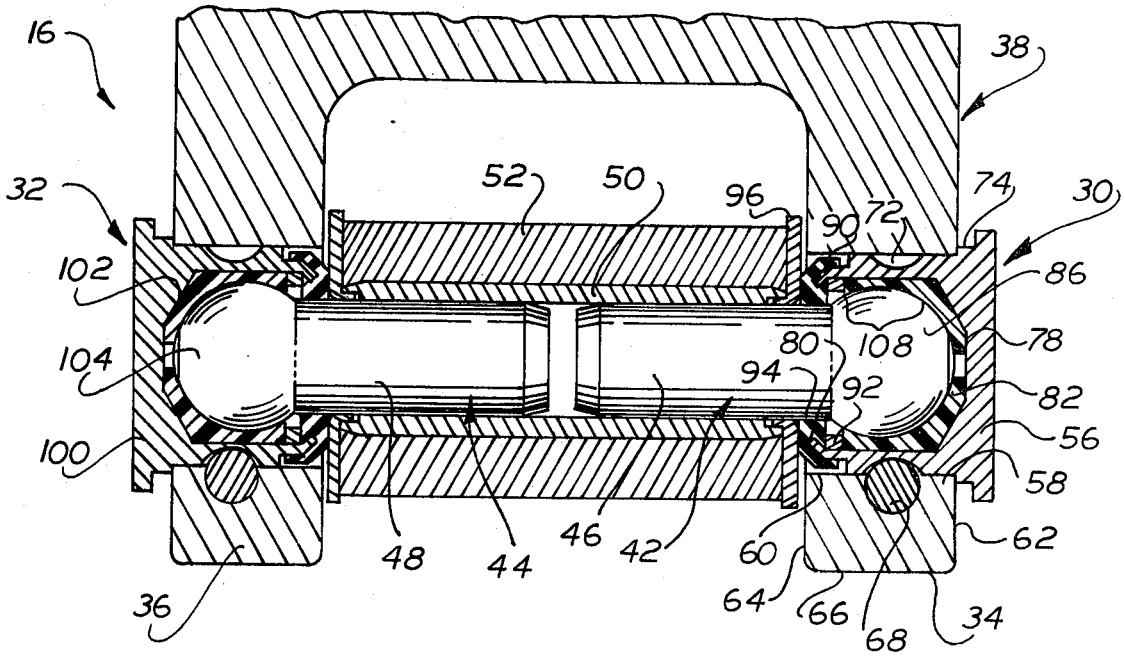
Fig. 2

SPRING SHACKLE ASSEMBLY

Matter enclosed in heavy brackets [ ] appears in the original patent but forms no part of this reissue specification; matter printed in italics indicates the additions made by reissue.

BACKGROUND OF THE INVENTION

This invention relates generally to a spring shackle assembly and more particularly to a spring shackle assembly in which a pair of ball studs are utilized to connect an end portion of a spring with a frame of a vehicle.

Many different types of shackle assemblies have been utilized to connect one end portion of a spring with the frame of a vehicle. U.S. Pat. Nos. 1,362,720 and 1,853,043 disclose shackle assemblies in which bushings having either conical or hemispherical head portions are used to mount a spring. Since the bushings of these known shackle assemblies have conical or hemispherical head portions, the force applied to a mounting bracket must necessarily have a relatively large axial or sidewise component which tends to unduly load the mounting bracket. This relatively large sidewise load component results from the fact that each of the hemispherical or conical bushing end portions is effective to apply a sidewise force to similarly shaped bearing surface. Due to the sloping configuration of the bearing surface, the resulting force components applied to the shackle mounting brackets must of necessity have a substantial axial component.

Other known shackle mounting arrangements are disclosed in U.S. Pat. Nos. 2,016,757; 1,807,099; 1,767,717 and 794,289. The various shackle mounting arrangements disclosed in the aforementioned U.S. patents include a plurality of parts which are assembled at the time of mounting an end portion of a spring. Of course, the assembling of these parts at the time which a spring is mounted tends to complicate the mounting of the spring. In addition, due to the use of many interconnected parts, these known spring shackle assemblies tend to have a plurality of openings through which dirt can enter between bearing surfaces. The mounting of these spring shackle assemblies is also complicated by the fact that manufacturing tolerances tend to make the interconnecting of a plurality of parts rather difficult if all of the tolerances buildup in the same direction.

SUMMARY OF THE PRESENT INVENTION

The present invention provides a new and improved spring shackle assembly which is utilized in an improved vehicle suspension system to connect an end portion of a leaf spring with the frame of a vehicle. This spring shackle assembly includes a pair of ball joints which interconnect an end portion of the leaf spring and a mounting bracket. Each of the ball joints includes a rigid metal housing which is received in an opening formed in an arm of the mounting bracket. A ball stud has a spherical head end portion disposed in a spherical cavity formed in a bearing liner. A shank of the ball stud extends outwardly from the bearing liner and is disposed in one side of an end portion of the spring. The other ball joint is of the same construction and has a ball stud with a shank which is received in the other side of the rolled end portion of the spring.

In order to facilitate mounting of the spring, the ball joints are preassembled and the head end portions are permanently lubricated and sealed to keep out dirt and other foreign particles and to minimize maintenance requirements. The preassembled ball joint construction also facilitates replacement of a ball joint after an extended period of use.

In accordance with a feature of the present invention, the spherical head end portions of the ball studs cooperate with spherical surfaces of bearing liners to apply at least partially offsetting sideward forces to the bearing liners to thereby tend to minimize the load applied to the mounting bracket. Minimizing the load applied to the mounting bracket enables the size and weight of the bracket to be reduced. It is contemplated that the mounting bracket may advantageously be made of aluminum in order to save weight and expedite fabrication of the mounting bracket.

In accordance with another feature of the present invention, each of the bearing liners may be formed in two sections. One of the bearing liner sections is advantageously formed of a material having a relatively high modulus elasticity so that it is relatively incompressible and wear resistant. The second bearing section is formed of a material having a relatively low modulus of elasticity to facilitate resiliently compressing this bearing section. When wear occurs between the head portion of a ball stud and the bearing sections, the resiliently compressed bearing section expands to maintain tight engagement between the head end portion of the ball stud and the liner section to thereby compensate for wear between the outer surface of the ball stud head portion and the bearing liner sections. The inner bearing liner section is advantageously formed of the material having a relatively high modulus of elasticity so that inwardly directed bearing load forces are applied to the mounting brackets to retard spreading apart of the mounting brackets.

In accordance with still another feature of the present invention, an improved vehicle suspension includes a leaf spring which is connected with the frame of a vehicle by at least three shackle assemblies. One of the shackle assemblies is connected with one end portion of the leaf spring and a pair of shackle assemblies are connected with the opposite end portion of the leaf spring. The shackle assemblies have the same construction and include a pair of ball studs having spherical head end portions which are disposed in cavities formed by bearing liners. Each of the bearing liners may be either integrally formed or formed by a pair of sections with one of the bearing sections having a greater modulus of elasticity than the other bearing section.

Accordingly, it is an object of the present invention to provide a new and improved shackle assembly for use in connecting one end portion of a leaf spring with the frame of a vehicle and wherein the shackle assembly includes a pair of ball joints.

Another object of this invention is to provide a new and improved spring shackle assembly as set forth in the next preceding object and wherein ball joints have studs with spherical head end portions which are received in spherical bearing liner chambers to provide for the application of at least partially offsetting sideward forces between the ball studs and the bearing liners.

Another object of this invention is to provide a new and improved shackle assembly for connecting one end portion of a leaf spring with the frame of a vehicle and wherein the shackle assembly includes a pair of ball joints having studs with head end portions which are received in bearing liners and wherein the bearing liners are formed by a pair of sections, one of which has a greater modulus of elasticity than the other.

Another object of this invention is to provide a new and improved vehicle suspension system in which at least three ball joints are utilized to connect a leaf spring with the frame of a vehicle and wherein each of the ball joints includes a pair of ball studs having head end portions which are received in bearing cavities formed by bearing liners.

Another object of the invention is to provide a new and improved spring shackle assembly for use in connecting an end portion of a leaf spring with the frame of a vehicle and wherein the spring shackle assembly includes a pair of sealed and permanently lubricated ball joints which are connected with an end portion of the leaf spring and a mounting bracket to facilitate initial assembly and subsequent replacement of the ball joints.

BRIEF DESCRIPTION OF THE DRAWINGS

The foregoing and other objects and features of the present invention will become more apparent upon a consideration of the following description taken in connection with the accompanying drawings wherein:

FIG. 1 is a fragmentary schematic illustration of an improved vehicle suspension system in which a leaf spring is connected with the frame of a vehicle by a plurality of shackle assemblies each of which is constructed in accordance with the present invention;

FIG. 2 is a sectional view, taken generally along the line 2—2 of FIG. 1, further illustrating the construction of a shackle assembly;

FIG. 3 is a schematic illustration depicting the application of bearing load forces to a liner by a head end portion of a ball stud of the shackle assembly of FIG. 2;

DESCRIPTION OF SPECIFIC PREFERRED EMBODIMENTS OF THE INVENTION

Figure 4:
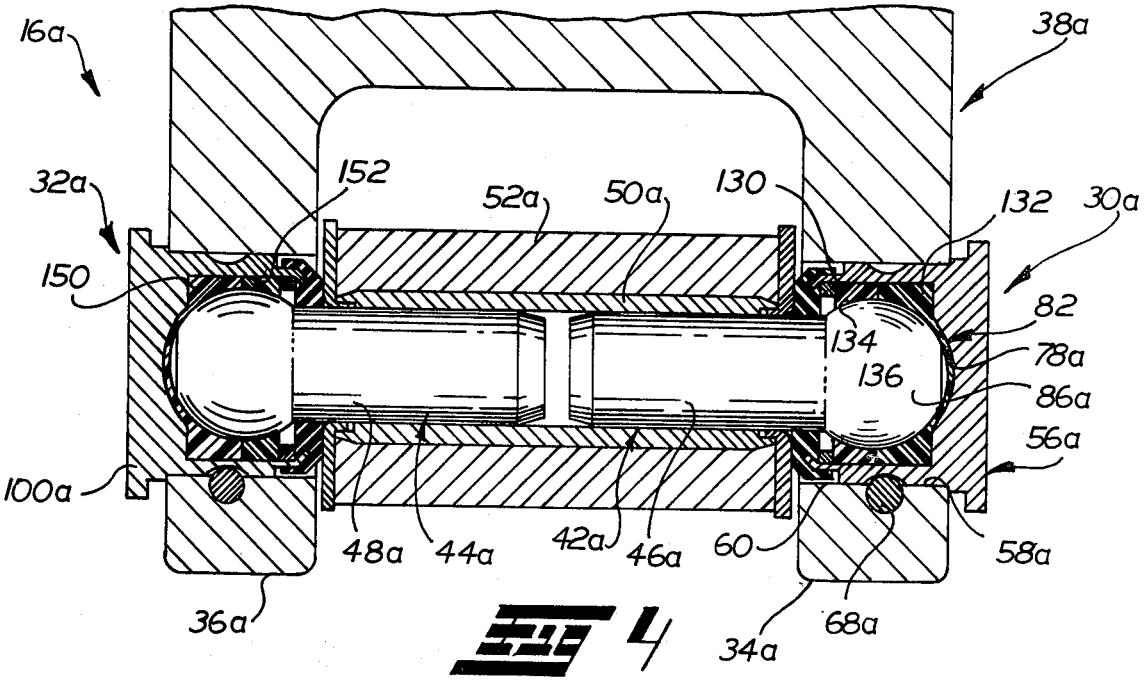
FIG. 4 is a sectional view, generally similar to FIG. 2, illustrating the construction of a second embodiment of the shackle assembly.

An improved vehicle suspension system 10 is illustrated in FIG. 1 and includes a leaf spring 12 which is connected with the frame 14 of a vehicle by means of a plurality of identical shackle assemblies 16, 18 and 20. A wheel axle 24 is mounted on a central portion of the spring 12 and is connected with a vehicle wheel (not shown) in a well known manner. A shock absorber 26 is connected with the axle 24.

In accordance with a feature of the present invention, the spring shackle assembly 16 includes a pair of sealed and permanently lubricated ball joints 30 and 32 (FIG. 2) which are disposed in a coaxial relationship on downwardly extending arms or sections 34 and 36 of a mounting bracket 38. Ball studs 42 and 44 of the ball joints 30 and 32 have cylindrical shank end portions 46 and 48 which are received within a cylindrical sleeve 50 disposed within a wrapped around end or eye portion 52 of the leaf spring 12.

The coaxial shanks 46 and 48 of the ball studs 42 and 44 are disposed in tight sliding engagement with the cylindrical sleeve 50. If desired, the shanks 46 and 48 could be knurled to provide a gripping action between the shank and the sleeve. It is contemplated that it may be desirable to eliminate the sleeve 50 and mount the shanks 46 and 48 in direct engagement with the cylindrical inner surface of the spring end portion 52.

The ball joint 30 includes a rigid metal housing 56 having a cylindrical surface 58 which engages a cylindrical surface 60 of an opening formed in the bracket arm 34. The bracket arm 34 is split or bifurcated so that a slot extends between inner and outer side surfaces 62 and 64 of the arm 34 and is effective ot connect the opening 60 with the bottom surface 66 of the arm. A pinch bolt 68 extends through a hole formed in the split arm 34. When the ball joint 30 has been mounted in the desired position relative to the arm 34, the pinch bolt 68 is tightened and the two sections of the arm are squeezed together to clampingly grip the outside surface 58 of the housing 56 with the surface 60. In addition to clamping the ball joint housing 56 securely in the bracket mounting arm 34, the pinch bolt 68 engages an annular groove 72 formed in the outside of the housing 56 to hold the housing 56 against axial movement relative to the arm 34. The housing 56 is advantageously provided with an annular rim 74 which engages the outer surface 62 of the bracket arm 34 to position the housing 56 axially relative to the bracket arm. Although it is preferred to use the pinch bolt 68 to locate and secure the housing 56, the housing could be secured by other methods, such as by screw threads on the housing and openings in the arms 34 or by riveting a flange on the housing to the arm.

A socket chamber 78 is formed in the housing 56 and has an open end portion 80 facing toward the opposite bracket arm 36 and through which the shank 46 extends. A one-piece bearing liner 82 is disposed within the socket chamber 78 and encloses a spherical head end portion 86 of the ball stud 42. The bearing liner 82 is a generally cylindrical molded block or plug of low friction polymeric material which is rigid while, to some extent, being compressible. The polymeric material forming the integral bearing liner 82 is a high density polyolefine such as the polyethyline material sold by Phillips Chemical Company under the tradename "Marlex" or by the DuPont Company under the tradename "Alathon".

The bearing liner 82 and head end portion 86 of the ball stud 42 are held in the socket chamber 78 by an annular lip 90 which circumscribes the open end of the socket chamber 78 and presses a retainer ring 92 firmly against an annular end surface of the bearing liner 82. The socket chamber 78 is filled with a suitable lubricant and then permanently closed by a seal 94 which is connected with the annular lip 90 and sealingly engages the shank 46 of the ball stud. A circular spacer or disc 96 is provided to press the seal 94 inwardly and to protect the seal against damage. The seal 94 is flexible to enable the ball stud 42 to rotate and tilt relative to the bearing liner 82 and housing 56.

Although only the construction of the ball socket 30 has been extensively described herein, it should be understood that the ball socket 32 has the same construction and includes a housing 100 disposed in an opening in the bracket arm 36. A bearing liner 102 is disposed within the housing 100 and engages a spherical head end portion 104 of the ball stud 44. The two ball studs 42 and 44 cooperate with each other and the mounting bracket 38 to support the end portion 52 of the spring for rotation about the coincident central axes of the ball studs.

In accordance with a feature of the present invention, the ball joints 30 and 32 tend to minimize the load applied to the bracket arms 34 and 36 in a sidewise direction, that is in a direction tending to spread the bracket arms 34 and 36 apart. By minimizing the axially directed forces tending to spread the bracket arms 34 and 36, the load on the bracket 38 is reduced. Upon experimentation it has been determined that the use of the ball joints 30 and 32 reduces the sidewise or axially directed forces applied to the bracket arms 34 and 36 to such an extent that the mounting bracket 38 can be formed of aluminum rather than steel. The forming of the mounting bracket 38 of aluminum reduces the weight of the mounting bracket and facilitates forming the mounting bracket. It should be noted that with many known spring shackle assemblies it is impossible to form the mounting bracket of aluminum since the forces applied to the mounting bracket due to the load on the associated leaf spring are sufficient to permanently deform a relatively weak aluminum mounting bracket.

The ball joint 30 tends to minimize the sideward or axially directed forces applied to the bracket arm 34 by applying axially offsetting forces to the bearing liner 82. The spherical head end portion 86 of the ball stud 42 has an annular medical or central surface area 108. The surface area 108 applies radially directed forces to a spherical inner surface 110 of the bearing liner 82 in the manner indicated schematically by the arrows 112 in FIG. 3.

It should be noted that the forces applied to the bearing liner 82 on opposite sides of the center of the spherical surface 110 by the surface area 108 of the ball stud have oppositely directed sideward or axial components which are offsetting so that there is a relatively small net sideward or axial loading of the bracket arm 34. Thus, the forces applied to the spherical bearing surface 110 on the left (as viewed in FIG. 3) side of a plane 114 extending through the center 116 of the ball head 86 in a direction perpendicular to the central axis of the shank 46 have a leftward component. The forces on the opposite or right side of the plane 114 have a sideward component directed in the opposite direction, that is toward the right (as viewed in FIG. 3). The offsetting sideward components of the forces applied to the bearing liner 82 by the spherical ball head 86 tends to minimize the sideward loading of the bracket arm 34.

By minimizing the sideward loading of the bracket arm 34, the bracket arm is loaded primarily in tension by normal spring loads. The strength of the aluminum bracket arm 34 in tension is sufficient to withstand these bearing loads. However, if a stud having a hemispherical ball head was used rather than the spherical ball head 86, the forces applied to the mounting bracket would have such a large axial or sideward component that the mounting bracket would have to be made relatively strong and would, in all probability, have to be formed of steel.

It should be noted that in addition to minimizing the sideward or axial forces applied to the mounting bracket 38, the ball joints 30 and 32 facilitate initial mounting of the spring 12 on the frame 14 of the vehicle. This is because the ball joints 30 and 32 are preassembled and are readily slipped into the two bracket arms 34 and 36. If it is necessary to replace a ball joint after an extended period of use, the pinch bolts associated with the two bracket arms 34 and 36 are released. The ball joints 30 and 32 are then withdrawn from the bracket arms. New ball joints can then be positioned on the bracket arms in engagement with the spring eye.

Figure 5:
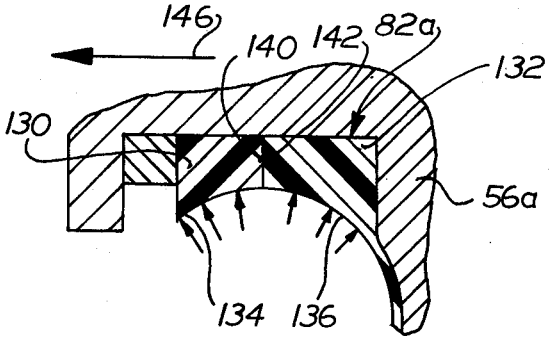
FIG. 5 is a schematic illustration depicting the application of bearing load forces to a pair of bearing sections of the shackle assembly of FIG. 4.

In the embodiment of the invention illustrated in FIG. 2, the shackle assembly 16 is provided with a bearing liner 82 having a one-piece construction. In the embodiment of the invention illustrated in FIGS. 4 and 5 the shackle assembly has a bearing liner formed by a plurality of sections. By forming the bearing liner with a plurality of sections, one of the sections can be formed of a deformation resistant material having a relatively high modulus of elasticity and another section can be formed of a resiliently compressible material having a relatively low modulus of elasticity. The bearing section having the relatively low modulus of elasticity is compressed so that when wear occurs between the components of the ball joint, this bearing section expands to compensate for the wear. Since the embodiment of the invention illustrated in FIGS. 4 and 5 is generally similar to the embodiment of the invention illustrated in FIGS. 1–3, similar numerals will be utilized to identify similar components, the suffix letter "a" being associated with the numerals of FIGS. 4 and 5 to avoid confusion.

The spring shackle assembly 16a (FIG. 4) includes a pair of sealed and permanently lubricated ball joints 30a and 32a which are disposed in a coaxial relationship on downwardly extending arms or sections 34a and 36a of a mounting bracket 38a. Ball studs 42a and 44a of the ball joints 30a and 32a have cylindrical shank end portions 46a and 48a which are received within a cylindrical sleeve 50a disposed within an end portion 52a of a leaf spring. The coaxial shanks of the ball studs 42a and 44a are disposed in tight frictional engagement with the cylindrical sleeve 50 to hold the shanks against axial movement relative to each other and to the sleeve 50a.

The ball joint 30 includes a rigid metal housing 56a having a cylindrical outer surface 58a which engages a cylindrical surface of an opening 60a formed in the bracket arm 34a. The bracket arm 34a is split and has an opening which receives a pinch bolt 68a which positions the housing 56a in the cylindrical opening and holds the housing against axial movement relative to the bracket arm 34a.

A socket chamber 78a is formed in the housing 56a and has an open end portion facing toward the opposite bracket arm 36a. The ball stud 42a and housing 56a are disposed in a coaxial relationship with the ball stud 44a and housing 100a of the ball socket joint 32a. The two ball studs 42a and 44a cooperate with each other and the mounting bracket 38a to support the end portion 52a of the spring for rotation about the coincident central axes of the ball studs.

In accordance with a feature of this embodiment of the invention, a bearing liner 82a is formed by a pair of bearing sections 130 and 132. The bearing section 130 has a generally annular configuration and is disposed adjacent to the open end portion of the bearing cavity 78a. The two bearing sections 130 and 132 have spherical inner surfaces 134 and 136 which define a bearing cavity in which a spherical head end portion 86a of the ball stud 42a is received. The two bearing sections 130 and 132 are provided with flat annular end surfaces 140 and 142 (see FIG. 5) which abut each other at a plane which extends perpendicular to the central axis of the shank 46a and extends through the center of the spherical head end portion 86a.

The forces applied to the bearing liner 82a on opposite sides of the center of the spherical surfaces 134 and 136 by the head end portion 86a of the ball stud 42a have oppositely directed sideward or axial components which are offsetting so that there is a relatively small net sideward or axial loading of the bracket arm 34a. Thus, the forces applied to the spherical bearing surface 134 have a leftward component. The forces on the spherical bearing surface 136 have a sideward component directed in the opposite direction, that is toward the right (as viewed in FIG. 5). The offsetting sideward components of the forces applied to the bearing liner 82a by the spherical ball head 86a tends to minimize the sideward loading of the bracket arm 34a.

In accordance with another feature of this embodiment of the invention, the bearing sections 130 and 132 are formed by materials having different moduli of elasticity. Thus, one of the bearing sections is made of a relatively hard wear resistant material having a high modulus of elasticity. The other bearing section is made of a resilient material having a relatively low modulus of elasticity. The relatively hard bearing section carries a majority of the spring load transmitted between the ball stud 42a and the bearing liner 82a. The bearing section having the relatively low modulus of elasticity is resiliently compressed within the socket chamber 78a and, upon the occurrence of wear between the head end portion 86a of the ball stud 42a and the bearing liner 82a, expands to maintain the spherical surfaces 134 and 136 of the bearing sections 130 and 132 in tight abutting engagement with the head end portion of the ball stud. Of course, this increases the effective operating life of the ball joint 30a.

To minimize the tendency of the arms 34a and 36a of the mounting bracket 38a to spread apart or separate under the influence of spring load forces, the bearing section 130 has a relatively high modulus of elasticity so that a major portion of the spring load applied to the ball joint 30a is transmitted between the head end portion 86a of the ball stud 42a and the bearing section 130. The difference in the load applied to the two liner sections 130 and 132 is illustrated schematically in FIG. 5 in which the relatively large force applied to the bearing liner section 130 is represented by arrows of a greater length than those representing the force applied to the bearing liner section 132. The relatively long force applied to the liner section 130 has a load component, represented by the arrow 146 in FIG. 5, which is directed inwardly toward the space between the mounting bracket arms 34a and 36a. This inwardly directed load component is transmitted from the bearing section 130 to the housing 56a and the bracket arm 34a. Therefore, the bracket arm 34a is urged inwardly toward the end portion 52a of the spring.

Since the end portion 52a of the spring has a width which is only slightly less than the distance between the two bracket arms 34a and 36a, the bracket arm 34a can not be deflected inwardly through a substantial distance. The operating load which is transmitted to the mounting arm 34a does not tend to cause the mounting arm 34a to deflect outwardly away from the opposite arm 36a. Minimizing the effective outwardly directed bending load applied to the bracket arm 34a enables the bracket arm to be made of relatively light material, such as aluminum.

Although the bearing sections 130 and 132 could be formed of many different materials, in one specific embodiment of the invention the bearing secton 130 was formed of a Nylon resin having a tensile strength of 10,000 to 20,000 psi, a maximum elongation of approximately 300 percent, and a flectural modulus of elasticity of between 140,000 and 1,000,000 psi, a maximum deformation of 2 percent under a load of 2,000 psi load at 122° F., and a shear strength of 6,200 to 12,000 psi. One commercially available Nylon resin having these characteristics is sold under the trademark "Zytel 101" by DuPont. This material has a low coefficient of friction and is stable under heavy loads so that undesirable extrusion of the bearing section 130 will not occur during loading of the shackle assembly 16a.

The bearing section 132 has a relatively low modulus of elasticity so that it can be resiliently compressed in the housing 56a to compensate for wear of the ball joint 30a. Although the bearing section 132 could be made of many different materials, it is contemplated that a material having high density ethylene copolymers and polypropylene copolymers could be utilized. The material should have a density of between 0.89 and 0.95 gm./cc, a tensile strength of 2,900 to 4,700 psi, a notch impact strength of 1.1 to 12.00 ft. lbs./inch, a flectural modulus of between 155,000 to 600,000 psi. One suitable material for the bearing section is sold by Phillips Chemical Company under the tradename "Marlex 5002" or "Marlex 5003". Another suitable copolymer material for the bearing section 132 is sold by DuPont under the tradename "Alathon 762". It is contemplated that the two bearing sections 130 and 132 could be made of many different materials other than the ones set forth above.

The ball joint 32a is of the same construction as the ball joint 30a and includes a pair of bearing liner sections 150 and 152. The bearing liner section 150 has a relatively high modulus of elasticity so that it is relatively hard and capable of withstanding substantial spring loads. The bearing section 152 on the other hand has a relatively low modulus of elasticity and is compressed to enable it to expand and compensate for wear in the manner previously explained in connection with the ball joint 30a. It should be noted that this results in the application of the mounting bracket arm 36a of an inwardly directed load component to prevent spreading apart of the bracket arms 34a and 36a in the manner previously explained in connection with the ball joint 30a. It should be noted that a ball joint having bearing sections of a suitable material is disclosed in U.S. Pat. No. 3,486,778 to Edward J. Herbenar and Richard Cass.

Although only the construction of the shackle assemblies 16 and 16a has been fully described herein, it should be understood that the shackle assemblies 18 and 20 have the same construction as the spring shackle assembly 16. It should also be noted that the shackle assemby 16 is connected with the frame 14 of the vehicle by the shackle assembly 18 (see FIG. 1) in such a manner as to enable the associated end portion of the spring 12 to shift longitudinally relative to the frame 14 upon the application of a load in the suspension system 10. Thus, the mounting bracket for the shackle assembly 16 is provided with an upwardly projecting connector section through which there is formed an opening, corresponding to the opening in the spring end portion 52. This opening receives the shank portions of ball studs of the shackle assembly 18 in the same manner as in which the end portion 52 of the spring receives the shank portions 46 and 48 of the ball studs 42 and 44. This enables the rightward (as viewed in FIG. 1) end portion of the spring 12 to pivot about two axes, that is the central longitudinal axis of the spring shackle assembly 16 and the central longitudinal axis of the spring shackle assembly 18 upon the application of a load to the spring 12. This facilitates changing the arc curvature of the leaf spring 12 upon the application of a load to the vehicle suspension system 10.

In view of the foregoing it is apparent that the present invention provides a new and improved spring shackle assembly 16 which is utilized to connect an end portion 52 of a leaf spring 12 with the frame 14 of a vehicle. This spring shackle assembly includes a pair of ball joints 30 and 32 which interconnect an end portion of the leaf spring 12 and a mounting bracket 38. Each of the ball joints 30 and 32 includes a rigid metal housing 56 which is received in an opening formed in an arm of the mounting bracket. A ball stud 42 has a spherical head end portion 86 disposed in a spherical cavity 110 formed in a bearing liner 82. A shank 46 of the ball stud 42 extends outwardly from the bearing liner 82 and is disposed in one side of the end portion 52 of the spring 12. The other ball joint 32 is of the same construction and has a ball stud 44 with a shank 48 which is received in the other side of the rolled end portion 52 of the spring.

In order to facilitate mounting of the spring 12, the ball joints 30 and 32 are preassembled and the head end portions 86 and 104 are permanently lubricated and sealed to keep out dirt and other foreign particles and to minimize maintenance requirements. The preassembled ball joint construction also facilitates replacement of a ball joint after an extended period of use.

In accordance with a feature of this embodiment of the invention, the spherical head end portions of the ball studs 42 and 44 cooperate with a spherical surface of the bearing liners 82 and 102 to apply at least partially offsetting sideward forces to the bearing liners (see FIG. 3) to thereby tend to minimize the load applied to the mounting bracket 38. Minimizing the load applied to the mounting bracket 38 enables the size and weight of the bracket to be reduced. It is contemplated that the mounting bracket 38 may be advantageously be made of aluminum in order to save weight and expedite fabrication of the mounting bracket.

In the embodiment of the invention, illustrated in FIGS. 4 and 5, the spring shackle assembly 16a has ball joints 30a and 32a with bearing liners formed by a pair of bearing sections. The bearing liner sections advantageously have different moduli of elasticity to enable the bearing liner sections to compensate for ball joint wear. In addition, the ball joints 30a and 32a are constructed with the bearing liner sections having relatively high moduli of elasticity on the inside to minimize load forces tending to bend the bracket arms 34a and 36a outwardly.

Having described specific preferred embodiments of the invention, the following is claimed:

1. A spring shackle assembly for use in connecting an end portion of a leaf spring with the frame of a vehicle, said spring shackle assembly comprising a bracket connected with the frame of the vehicle, said bracket including a pair of mounting sections spaced apart by a distance which is at least as great as the width of the end portion of the spring and having surfaces defining a pair of coaxial openings extending through the mounting sections, a pair of rigid metal housings each of which is disposed in an associated one of said openings, each of said housings having an inner surface at least partially defining a socket chamber having a closed end portion and open end portion facing toward the space between said mounting sections, a pair of bearing liners formed of polymeric material, each of said bearing liners being disposed in an associated one of said socket chambers and having a spherical inner surface at least partially defining a bearing cavity having an open end facing toward the space between said mounting sections, a pair of ball studs each of which is associated with one of said bearing liners, each of said ball studs having a head end portion with a spherically shaped outer surface disposed in sliding engagement with the spherical inner surface of the associated one of said bearing liners and having a cylindrical shank portion integrally formed with an associated head end portion and extending outwardly through a socket chamber opening into the space between said mounting sections, said shank portions being disposed in axial alignment with each other and being disposed in an opening in the end portion of the leaf spring, each of said spherical head end portions having a circular medial surface area which is coaxial with the central axis of the associated shank portion and which extends for a substantial distance on both sides of a plane through the center of the spherical head end portion to provide abutting engagement between the circular medial surface area of the head portion of the ball stud and the spherical surface of the associated one of said bearing liners in an area which forms at least part of a sphere and curves inwardly toward the central axis of the shank portion of the ball stud on opposite sides of the plane through the central axis of the head portion of the ball stud to provide for the application of at least partially axially offsetting bearing forces between the ball stud head portion and said bearing liner upon the application of a load to the vehicle spring.

2. A spring shackle assembly as set forth in claim 1 wherein each of said housings includes an annular inwardly projecting lip means circumscribing the open end portion of a socket chamber for retaining the associated one of said bearing liners in said socket chamber.

3. A spring shackle assembly as set forth in claim 1 wherein each of said housings includes surface means defining an annular groove extending around the housing, said spring shackle assembly further including a pair of retainer members mounted on an associated one of said mounting sections in engagement with the annular groove in the associated one of said housings to retain the housing against movement relative to the associated mounting section.

4. A spring shackle assembly as set forth in claim 3 wherein each of said retainer members includes means for deflecting the associated mounting section to apply a clamping force to the associated housing.

5. A spring shackle assembly as set forth in claim 1 wherein each of said bearing liners includes a first section having a first modulus of elasticity and a second section having a second modulus of elasticity which is greater than said first modulus of elasticity, said spherical inner surface of each of said bearing liners being partially disposed on the first section of the associated one of said bearing liners and being partially disposed on the second section of the associated one of said bearing liners.

6. A spring shackle assembly as set forth in claim 5 wherein the head end portion of each of said ball studs is effective to apply a first bearing force to said first section of the associated one of said bearing liners and is effective to apply a second bearing force which is less than said first bearing force to said second bearing section of the associated one of said bearing liners.

7. A spring shackle assembly for use in connecting an end portion of a leaf spring with the frame of a vehicle, said spring shackle assembly comprising a pair of mounting sections spaced apart by a distance which is at least as great as the width of the end portion of the spring, a pair of housings each of which is connected with one of said mounting sections, each of said housings having an inner surface at least partially defining a socket chamber having a closed end portion and open end portion facing toward the space between said mounting sections, a pair of bearing liner sections disposed in each of said socket chambers with a first one of each pair of bearing liner sections being disposed adjacent to the closed end portions of the associated one of said socket chambers and a second one of each pair of bearing liner sections being disposed adjacent to the open end portion of the associated one of said socket chambers, said first and second bearing liner sections of each pair of bearing liner sections having spherical inner surfaces at least partially defining a bearing cavity having an open end facing toward the space between said mounting sections, a pair of ball studs, each of said ball studs having a head end portion with a spherically shaped outer surface disposed in sliding engagement with the spherical inner surfaces of the associated pair of bearing liner sections and having a cylindrical shank portion extending into the space between said mounting sections, said shank portions being disposed in an opening in the end portion of the leaf spring, said first bearing liner sections have a first modulus of elasticity and said second bearing liner sections have a second modulus of elasticity which is greater than said first modulus of elasticity, said first bearing liner sections being compressed so that they will expand to maintain tight engagement between the head end portion of the associated one of said ball studs and said second bearing liner sections to compensate for wear between the outer surfaces of said ball stud head end portions and said bearing liner sections.

8. A shackle assembly as set forth in claim 7 wherein each of said spherical head end portions has a circular medial surface area which has a substantial portion disposed in abutting engagement with the spherical surface of one of said first bearing liner sections and a substantial portion disposed in abutting engagement with the spherical surfaces of one of said second bearing liner sections.

9. A spring shackle assembly for use in connecting an end portion of a leaf spring with the frame of a vehicle, said spring shackle assembly comprising a pair of mounting sections spaced apart by a distance which is at least as great as the width of the end portion of the spring, a pair of housings each of which is connected with one of said mounting sectons, each of said housings having an inner surface at least partially defining a socket chamber having a closed end portion and open end portion facing toward the space between said mounting sections, a pair of bearing liner sections disposed in each of said socket chambers with a first one of each pair of bearing liner sections being disposed adjacent to the closed end portions of the associated one of said socket chambers and a second one of each pair of bearing liner sections being disposed adjacent to the open end portion of the associated one of said socket chambers, said first and second bearing liner sections of each pair of bearing liner sections having spherical inner surfaces at least partially defining a bearing cavity having an open end facing toward the space between said mounting sections, a pair of ball studs, each of said ball studs having a head end portion with a spherically shaped outer surface disposed in sliding engagement with the spherical inner surfaces of the associated pair of bearing liner sections and having a cylindrical shank portion extending into the space between said mounting sections, said shank portions being disposed in an opening in the end portion of the leaf spring, said head end portion of each of said ball studs being effective to apply to the first bearing liner section of the associated pair of bearing sections a first force urging the first bearing liner section away from the space between said mounting sections and to apply to the second bearing liner section of the associated pair of bearing liner sections a second force urging the second bearing liner section toward the space between said mounting sections, said second force being greater than said first force to retard spreading apart of said mounting sections.

10. A shackle assembly as set forth in claim 9 wherein said second bearing liner sections have a greater modulus of elasticity than said first bearing liner sections.

*11. A pivot means constructed to interconnect first and second members for angular displacement of one of said members relative to the other of said members about a fixed pivot axis;*

*said pivot means comprising a pair of ball studs;*

*each of said ball studs having a shank portion and a head portion;*

*said shank portions being in axial alignment with the ends of said shank portions being in juxtaposed relationship;*

*a sleeve surrounding said shank portions supported by one of said members;*

*a pair of socket means enclosing said head portions of said pair of ball studs;*

*each of said socket means being secured to the other of said members.*

*12. A pivot means for a suspension system for a motor vehicle having a frame member, a wheel support member constructed to rotatably support a road wheel and a leaf spring interconnecting said frame member and said wheel support member,*

*said pivot means being connected to said leaf spring and said frame member;*

*a pair of spaced apart supports connected to said frame member;*

*said leaf spring having an eye formed at one end and said eye being disposed between said supports;*

*a pair of ball studs having shank portions disposed in said eye;*

*said ball studs having a pair of spaced apart head portions;*

*each of said head portions being rotatably supported in a socket means;*

*said socket means being secured to said spaced apart supports;*

*whereby said leaf spring may deflect about a pviot axis that extends through said pair of spaced apart head portions and is fixed relative to said head portions and said socket means.*

*13. A pivot means according to claim 12 and including:*

*an annular thrust washer and seal surrounding said shank portions of each of said ball studs;*

*said thrust washers and seals having elastomeric sealing surfaces engaging said shank portions of said ball studs.*

*14. A pivot means according to claim 12 and including:*

*one of said socket means comprising a cup-shape plastic bearing supported in a socket part;*

*an annular retaining ring disposed in said socket part and engaging an end of said bearing;*

*said socket part having a peripheral lip engaging said retaining ring and exerting a preload on said bearing;*

*a first annular seal having a portion engaging said peripheral lip of said socket part, said retaining ring and said shank of said ball stud supported in said one socket means.*

*15. A pivot means according to claim 12 and including:*

*an annular thrust washer and seal surrounding said shank portions of each of said ball studs;*

*said thrust washers and seals having sealing surfaces engaging said shank portions of said ball studs.*

* * * * *